(12) United States Patent
Albu et al.

(10) Patent No.: US 8,587,665 B2
(45) Date of Patent: *Nov. 19, 2013

(54) FAST ROTATION ESTIMATION OF OBJECTS IN SEQUENCES OF ACQUIRED DIGITAL IMAGES

(75) Inventors: Felix Albu, Bucharest (RO); Larry Murray, Galway (IE); Piotr Stec, Galway (IE); Ilariu Raducan, Galway (IE)

(73) Assignee: DigitalOptics Corporation Europe Limited, Galway (IE)

( * ) Notice: Subject to any disclaimer, the term of this patent is extended or adjusted under 35 U.S.C. 154(b) by 155 days.

This patent is subject to a terminal disclaimer.

(21) Appl. No.: 13/028,203

(22) Filed: Feb. 15, 2011

(65) Prior Publication Data

US 2012/0206617 A1 Aug. 16, 2012

(51) Int. Cl.
*H04N 5/225* (2006.01)
*H04N 7/18* (2006.01)
*G06K 9/46* (2006.01)
*G06K 9/66* (2006.01)
*G06K 9/00* (2006.01)
*G06K 9/36* (2006.01)

(52) U.S. Cl.
USPC ........... 348/169; 348/135; 382/190; 382/107; 382/276

(58) Field of Classification Search
USPC .................... 348/36–39, 169–172, 135–142; 382/190–208, 107, 276, 286–299
See application file for complete search history.

(56) References Cited

U.S. PATENT DOCUMENTS

| | | | | |
|---|---|---|---|---|
| 5,164,717 | A * | 11/1992 | Wells et al. | 345/596 |
| 5,613,013 | A * | 3/1997 | Schuette | 382/124 |
| 5,923,365 | A * | 7/1999 | Tamir et al. | 348/169 |
| 6,025,879 | A * | 2/2000 | Yoneyama et al. | 375/240.24 |
| 6,448,769 | B1 * | 9/2002 | Rosenfeld et al. | 324/307 |
| 6,904,184 | B1 * | 6/2005 | Taylor | 382/294 |
| 7,315,631 | B1 | 1/2008 | Corcoran et al. | |
| 7,317,815 | B2 | 1/2008 | Steinberg et al. | |
| 7,428,345 | B2 * | 9/2008 | Caspi et al. | 382/294 |
| 7,460,695 | B2 | 12/2008 | Steinberg et al. | |
| 7,469,071 | B2 | 12/2008 | Drimbarean et al. | |
| 7,548,659 | B2 * | 6/2009 | Ofek et al. | 382/254 |
| 7,564,994 | B1 | 7/2009 | Steinberg et al. | |
| 7,606,417 | B2 | 10/2009 | Steinberg et al. | |
| 7,620,218 | B2 | 11/2009 | Steinberg et al. | |
| 7,626,612 | B2 * | 12/2009 | John et al. | 348/208.4 |
| 7,636,486 | B2 | 12/2009 | Steinberg et al. | |
| 7,639,888 | B2 | 12/2009 | Steinberg et al. | |

(Continued)

FOREIGN PATENT DOCUMENTS

WO  2012/004682 A2  1/2012

OTHER PUBLICATIONS

Co-pending U.S. Appl. No. 12/572,930.
Co-pending U.S. Appl. No. 12/636,608.

(Continued)

*Primary Examiner* — Chia-Wei A Chen
(74) *Attorney, Agent, or Firm* — Andrew V. Smith

(57) ABSTRACT

A measure of frame-to-frame rotation is determined. A global XY alignment of a pair of frames is performed. Local XY alignments in at least two matching corner regions of the pair of images are determined after the global XY alignment. Based on differences between the local XY alignments, a global rotation is determined between the pair of frames.

30 Claims, 5 Drawing Sheets

Schematic diagram indicating the relative direction of the local windows when the camera is rotated.

(56) References Cited

U.S. PATENT DOCUMENTS

| | | | |
|---|---|---|---|
| 7,639,889 B2 | 12/2009 | Steinberg et al. | |
| 7,660,478 B2 | 2/2010 | Steinberg et al. | |
| 7,676,108 B2 | 3/2010 | Steinberg et al. | |
| 7,680,342 B2 | 3/2010 | Steinberg et al. | |
| 7,692,696 B2 | 4/2010 | Steinberg et al. | |
| 7,697,778 B2 | 4/2010 | Steinberg et al. | |
| 7,773,118 B2 | 8/2010 | Florea et al. | |
| 7,796,816 B2 | 9/2010 | Steinberg et al. | |
| 7,796,822 B2 | 9/2010 | Steinberg et al. | |
| 7,844,076 B2 | 11/2010 | Corcoran et al. | |
| 7,864,990 B2 | 1/2011 | Corcoran et al. | |
| 7,868,922 B2 | 1/2011 | Ciuc et al. | |
| 7,912,285 B2 | 3/2011 | Steinberg et al. | |
| 7,953,287 B2 | 5/2011 | Drimbarean et al. | |
| 7,957,597 B2 | 6/2011 | Steinberg et al. | |
| 7,978,932 B2* | 7/2011 | Vercauteren et al. | 382/284 |
| 8,218,901 B2* | 7/2012 | Vercauteren et al. | 382/284 |
| 2001/0002922 A1* | 6/2001 | Hayashi | 375/240.16 |
| 2002/0015423 A1* | 2/2002 | Rakib et al. | 370/485 |
| 2002/0118892 A1* | 8/2002 | Nguyen et al. | 382/294 |
| 2004/0071324 A1* | 4/2004 | Norris et al. | 382/128 |
| 2004/0148577 A1* | 7/2004 | Xu et al. | 715/530 |
| 2005/0063608 A1* | 3/2005 | Clarke et al. | 382/284 |
| 2005/0275723 A1* | 12/2005 | Sablak et al. | 348/169 |
| 2006/0017739 A1* | 1/2006 | Fang et al. | 345/582 |
| 2006/0257042 A1* | 11/2006 | Ofek et al. | 382/255 |
| 2007/0008312 A1* | 1/2007 | Zhou et al. | 345/419 |
| 2007/0031063 A1* | 2/2007 | Zhou | 382/284 |
| 2007/0076977 A1* | 4/2007 | Chen et al. | 382/276 |
| 2007/0201726 A1 | 8/2007 | Steinberg et al. | |
| 2007/0269108 A1 | 11/2007 | Steinberg et al. | |
| 2007/0296833 A1 | 12/2007 | Corcoran et al. | |
| 2008/0181487 A1* | 7/2008 | Hsu et al. | 382/154 |
| 2008/0219517 A1 | 9/2008 | Blonk et al. | |
| 2008/0219581 A1 | 9/2008 | Albu et al. | |
| 2008/0278584 A1* | 11/2008 | Shih et al. | 348/169 |
| 2008/0309769 A1 | 12/2008 | Albu et al. | |
| 2008/0309770 A1 | 12/2008 | Florea et al. | |
| 2008/0317378 A1 | 12/2008 | Steinberg et al. | |
| 2009/0003661 A1 | 1/2009 | Ionita et al. | |
| 2009/0080796 A1 | 3/2009 | Capata et al. | |
| 2009/0167893 A1 | 7/2009 | Susanu et al. | |
| 2009/0179998 A1 | 7/2009 | Steinberg et al. | |
| 2009/0179999 A1 | 7/2009 | Albu et al. | |
| 2009/0189997 A1 | 7/2009 | Stec et al. | |
| 2009/0263022 A1 | 10/2009 | Petrescu et al. | |
| 2009/0303342 A1 | 12/2009 | Corcoran et al. | |
| 2009/0303343 A1 | 12/2009 | Drimbarean et al. | |
| 2009/0309769 A1 | 12/2009 | Au et al. | |
| 2009/0326552 A1* | 12/2009 | Diolaiti | 606/130 |
| 2010/0026831 A1 | 2/2010 | Ciuc et al. | |
| 2010/0053368 A1 | 3/2010 | Nanu et al. | |
| 2010/0054592 A1 | 3/2010 | Nanu et al. | |
| 2010/0060727 A1 | 3/2010 | Steinberg et al. | |
| 2010/0066822 A1 | 3/2010 | Steinberg et al. | |
| 2010/0141786 A1 | 6/2010 | Bigioi et al. | |
| 2010/0201826 A1 | 8/2010 | Steinberg et al. | |
| 2010/0201827 A1 | 8/2010 | Steinberg et al. | |
| 2010/0231738 A1* | 9/2010 | Border et al. | 348/222.1 |
| 2010/0238309 A1 | 9/2010 | Florea et al. | |
| 2010/0303343 A1 | 12/2010 | Lee et al. | |
| 2010/0321537 A1 | 12/2010 | Zamfir et al. | |
| 2010/0328472 A1 | 12/2010 | Steinberg et al. | |
| 2010/0329582 A1 | 12/2010 | Albu et al. | |
| 2011/0013043 A1 | 1/2011 | Corcoran et al. | |
| 2011/0013836 A1* | 1/2011 | Gefen et al. | 382/171 |
| 2011/0037639 A1* | 2/2011 | Duran Toro et al. | 342/22 |
| 2011/0064329 A1 | 3/2011 | Steinberg et al. | |
| 2011/0091065 A1* | 4/2011 | Chandrashekar et al. | 382/100 |
| 2011/0102553 A1 | 5/2011 | Corcoran et al. | |
| 2011/0102638 A1 | 5/2011 | Susanu et al. | |
| 2011/0134287 A1 | 6/2011 | Steinberg et al. | |
| 2011/0304687 A1* | 12/2011 | Joshi et al. | 348/36 |
| 2012/0002890 A1* | 1/2012 | Mathew | 382/232 |
| 2012/0007940 A1 | 1/2012 | Michrowski et al. | |
| 2012/0098986 A1* | 4/2012 | Robertson et al. | 348/222.1 |
| 2012/0105673 A1* | 5/2012 | Morales | 348/229.1 |

OTHER PUBLICATIONS

Co-pending U.S. Appl. No. 12/636,629.
Co-pending U.S. Appl. No. 12/820,034.
Co-pending U.S. Appl. No. 12/820,086.
Co-pending U.S. Appl. No. 12/879,003.
Co-pending U.S. Appl. No. 12/941,983.
Co-pending U.S. Appl. No. 12/944,701.
Co-pending U.S. Appl. No. 12/956,904.
B.Zitova, J. Flusser, Image registration methods: a survey, Image and Vision Computing 21 (2003) 977-1000.
Kuglin C D., Hines D C, The phase correlation image alignment method, In Proc. Int. Conf. Cybernetics and Society, IEEE, 1975.
M. Ma, A. Van Genderen, P. Beukelman, "A sign bit only phase normalization for rotation and scaleinvariant template matching", Proceedings of the 16th Annual Workshop on Circuits, Systems and Signal Processing, ProRisc 2005, pp. 641-646.
Chen Ting, "Video stabilization algorithm using a block-based parametric motion model", EE392J Project Report, 2000, Stanford University, CA.
G.S.Peake, T.N.Tan, "A general algorithm for document skew angle estimation", IEEE Int. Conf. Image Process. 2 (1997) 230-233.
Greg Ward, "Fast, robust image registration for compositing high dynamic range photographs from handheld exposures", Journal of graphic tools, 8(2):17-30, 2003.
Wikipedia reference: Cosine similarity, URL:http://en.wikipedia.org/wiki/Cosine_similarity.
Jonatan Blomster, "Orientation estimation combining vision and gyro measurements", Master's Degree Project. Stockholm, Sweden Apr. 6, 2006. XR-EE-SB 2006:012.
Yi Wan, Ning Wei, "A fast algorithm for recognizing translated, rotated, reflected and scaled objects from only their projections", IEEE Signal Processing Letters, vol. 17, No. 1, pp. 71-74, Jan. 2010.
Wei Huang, Zhongliang Jing, "Evaluation of focus measures in multi-focus image fusion", Pattern Recognition Letters, v.28 n.4, p. 493-500, Mar. 2007.

\* cited by examiner (a) The sum of absolute convoluted vectors difference for different variable vector lengths. Both horizontal and vertical profiles used.

(b) The estimated rotation angle in degrees value as a function of vector length for 512x512 image.

Schematic diagram indicating the relative direction of the local windows when the camera is rotated.

FAST ROTATION ESTIMATION OF OBJECTS IN SEQUENCES OF ACQUIRED DIGITAL IMAGES

RELATED APPLICATIONS

This application is one of three contemporaneously-filed applications by the same inventors and assignee including application Ser. No. 13/028,203, entitled, FAST ROTATION ESTIMATION, application Ser. No. 13/028,205, entitled, IMAGE ROTATION FROM LOCAL MOTION ESTIMATES, and application Ser. No. 13/028,206, entitled, OBJECT DETECTION FROM IMAGE PROFILES.

BACKGROUND

It is desired to have an efficient solution to find rotational variations between consecutive video frames or between image pairs. Such may be applied to blur determination and compensation, panorama creation, image stabilization and/or object tracking to list just a few examples among many more. Alternate solutions based on mutual information include Hough transforms, Radon transforms, Fourier transforms, and Polar transforms. However, it is desired to have a more efficient solution, as these alternate solutions are resource intensive.

A common problem in panorama creation, e.g., is the occurrence of rotation between two frames which are to be stitched or otherwise joined together. An alternative is to use high accuracy rotation estimation and resample the image before stitching which is computationally expensive and requires a large amount of memory. It is desired to have an application for panorama creation in a camera that corrects for and/or detects rotation before stitching or joining adjacent image segments.

Image rotation generally involves extra computation and processing time rendering it difficult to pull off in real time. Image re-sampling to compensate for rotation before images are stitched is slow and computationally expensive.

DETAILED DESCRIPTIONS OF THE EMBODIMENTS

Figure 1:
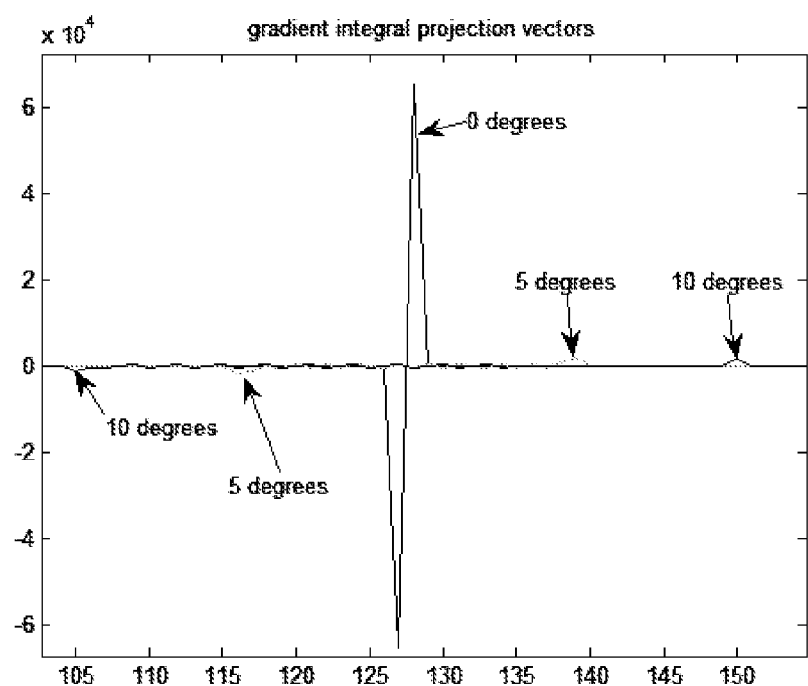
FIG. 1 is a plot based on a 256×256 image that illustrates the observation that the gradient of integral projection vectors obtained from lines passing through the binary image centre at different angles has one higher positive spike and one higher negative spike.

A technique is provided for performing, within an image acquisition device, a method of detecting rotation from matching corner regions of acquired images. A sequence of image frames is acquired. A measure of frame-to-frame rotation is determined. A global XY alignment is performed for a first frame and a second, following frame of the sequence of image frames. Local XY alignments are determined in at least two matching corner regions of the aligned pair of image frames. Based on the differences between the local XY alignments, a global rotation of the second frame relative to the first frame is determined. A further action is performed based on the determined global rotation.

Another technique is provided for performing, within an image acquisition device, a method of detecting rotation from matching regions of acquired images. A sequence of image frames is acquired. A measure of frame-to-frame rotation is determined. A global XY alignment of a first frame and second, following frame of the image sequence if performed. Local XY alignments are determined in at least two matching regions of the aligned image pair. Delta-X and delta-Y differences are determined between the at least two matching regions. A global frame-to-frame rotation is calculated from the delta-X and delta-Y differences. A further action is performed based on the calculated global frame to frame rotation.

A technique is also provided for performing, within an image acquisition device, a method of cross-correlating integral projection vectors. A sequence of image frames is acquired. A measure of frame-to-frame rotation is determined. Horizontal and vertical integral projection vector gradients are determined for each of a first frame and a second, following, image frame in said sequence. The integral projection vector gradients are normalized. Locations of primary maximum and minimum peaks of the integral projection vector gradients are determined. Based on normalized distances between the primary maximum and minimum peaks, a global image rotation is determined. A further action is performed based on the determined global image rotation.

Another technique is provided for performing, within an image acquisition device, a method of cross-correlating integral projection vectors. A sequence of image frames is acquired. A measure of frame-to-frame rotation is determined. Horizontal and vertical integral projection vectors are determined for each of a first frame and second, following, image frame in said sequence. A first integral projection vector is successively convoluting with a variable length vector. A second integral projection vector is convoluted with a fixed length vector. An absolute sum of differences is determined between filtered vectors based on the convoluting of the first and second integral projection vectors. Based on a length of a variable vector N that leads to a minimum value of the absolute sum of the differences, a global rotation of the second frame relative to the first frame is determined. A further action is performed based on the determined global rotation.

A technique is also provided for performing, within an image acquisition device, a method of determining moving objects in integral projection vectors. A sequence of image frames is acquired. A measure of frame-to-frame rotation is determined. A global XY alignment of a first frame and second, following frame of the image sequence is performed. At least one section of each of the X and Y integral projection vectors where aligned global vectors demonstrate a significant localized difference is determined. Based on X and Y locations of the at least one section of the X and Y integral projection vectors, location, relative velocity and/or approximate area of at least one moving object is/are determined within the sequence of image frames. A further action is performed based on the determined location, relative velocity and/or approximate area of the at least one moving object.

Another technique is provided for performing, within an image acquisition device, a method of determining moving objects in integral projection vectors. A sequence of image frames is acquired. A measure of frame-to-frame rotation is determined. A global alignment of a first frame and a second, following frame of the image sequence is performed. At least one section of an integral projection vector where the aligned global vectors demonstrate a significant localized difference is determined. Based on a location of each of the at least one section of the integral projection vector, an approximate size and relative velocity of at least one moving object within the sequence of image frames is determined. A further action is performed based on the determined approximate size or relative velocity, or both, of the at least one moving object.

In any of these techniques, the further action may include joining adjacent frames of a panorama image; and/or predicting a location of a tracked object in a subsequent frame; and/or providing an image with reduced blur than at least one of the first and second frames; and/or providing a more stable video sequence by removing one or more undesired motion artifacts.

In any of these techniques, delta-X and delta-Y differences may be determined between the at least two matching corner regions. The global rotation determining may be based further on the delta-X and delta-Y differences.

In any of these techniques, horizontal and vertical integral projection vector gradients may be determined for each of the first frame and the second, following, image frame in the sequence. The integral projection vector gradients may be normalized. Locations may be determined of primary maximum and minimum peaks of the integral projection vector gradients. The global rotation determining may be further based on normalized distances between the primary maximum and minimum peaks.

In any of these techniques, horizontal and vertical integral projection vectors may be determined for each of the first frame and the second, following, image frame in the sequence. A first integral projection vector may be successively convoluted with a variable length vector. A second integral projection vector may be convoluted with a fixed length vector. An absolute sum of differences may be determined between filtered vectors based on the convoluting of the first and second integral projection vectors. The global rotation determining may be further based on a length of a variable vector N that leads to a minimum value of the absolute sum of the differences.

In any of these techniques, a global XY alignment of a first frame and a second, following frame of the sequence of image frames may be performed. Local XY alignments may be determined in at least two matching corner regions of the aligned image pair. Based on the differences between the local XY alignments, a global rotation may be determined for the second image frame relative to the first. The further action may also be based on the determined global rotation.

Techniques may be performed in accordance with embodiments described herein that are fast and efficient for typical rotation values that appear between consecutive video frames (see, e.g., US2009/0303343, incorporated by reference) or other image pairs such as consecutive preview frames (see, e.g., US2010/0060727, incorporated by reference), adjacent image segments of panorama images (see, e.g., U.S. Ser. No. 12/636,608, incorporated by reference), pairs of low-light and normal light images that are combined to produce sharp, yet well-exposed images with handheld or otherwise portable cameras (see, e.g., US2009/167893, incorporated by reference), among other applications of these advantageous techniques. These techniques may be performed with advantageous results without the use of multiple image rotations with different angles.

A method which estimates the rotation between images or frames after being horizontally and vertically aligned is also provided. This technique uses integral projection techniques and can be applied on consecutive video frames or differently exposed image pairs or spectrally different image pairs or pairs of images acquired with different cameras, as a few examples. One Integral Projection (IP) vector may be successively convoluted with a variable length vector and the second IP vector may be convoluted with a fixed vector. The sum of the absolute differences of these filtered vectors is computed, and the length of the variable vector that leads to the minimum value over the selected range permits an estimation to be made of the rotation between two images or frames.

The use of the convolution between one integral projection vector with variable length vectors and comparison with the convolution of the other integral projection vector with a fixed vector permits an estimation of the rotation between images or consecutive frames. Rotation estimation refinement is provided by combining the results of translational estimations in local windows based on the integral projection method and the search method using the results of the comparison of IP vector convolutions.

Fast Rotation Estimation Method

A further technique is provided that estimates the rotation between two images. The two images can be two consecutive frames or image pairs, and are not necessarily taken with identical parameters or sensors. Several examples of such image pairs have been described above. In one embodiment, the estimation of rotation can be made on one channel from each image. For example, the Y channel, the gray-level image, the green channel, etc. may be selected. The horizontal and vertical integral projection vectors are then computed in this embodiment for pixels from both binary images obtained by thresholding the images (e.g., with the median or other average value of one image, or a smaller or larger value depending on the application). Several rotation estimation methods use a line detection procedure (see, e.g., JONATAN BLOMSTER, "Orientation estimation combining vision and gyro measurements", Master's Degree Project. Stockholm, Sweden 2006-04-06. XR-EE-SB 2006:012, incorporated by reference). The lines are a common feature in most images. If applied on successive frames, the detected lines can be useful in estimating the rotation between frames by using their directions.

Most rotation estimation techniques use the complicated Hough transform (see, e.g., B. ZITOVA, J. FLUSSER, "Image registration methods: a survey", Image and Vision Computing 21 (2003) 977-1000, incorporated by reference). In the image gradient domain, the line segments indicate changes in luminance levels. These changes can be captured in a binary image by using a suitable threshold.

The translational displacement between frame scan be obtained by comparing the horizontal and vertical integral projection (IP) vectors of the binary images (see, e.g., GREG WARD, "Fast, robust image registration for compositing high dynamic range photographs from handheld exposures", Journal of graphic tools, 8(2):17-30, 2003, incorporated by reference) or those of the gradient image (see, e.g., U.S. Ser. Nos. 12/879,003 and 12/636,629, both incorporated by reference). The horizontal IP vector is obtained by summing all the columns, while the vertical IP vector is obtained by summing all the rows of an image. The rotation at different angles of a detected line spread its contribution in the IP vectors differently.

A technique in accordance with advantageous embodiments uses the observation that the gradient of integral projection vectors obtained from lines passing through the binary image centered at different angles has one higher positive spike and one higher negative spike. FIG. 1 shows an example for a 256×256 image. The amplitude of the spikes decreases with the rotation angle due to a normalization step with a projection of the sum of non-null binary pixels. Also, the distance from the central position of the vector increases with the rotation angle and depends on the image size.

The technique in accordance with certain embodiments ignores the ripples between spikes, and outside them. They are set to zero in certain embodiments by imposing a threshold depending on the maximum vector value (e.g., one tenth of it). The energy of the spikes is concentrated in corresponding coefficients (see FIG. 2). Approximations on noise-less binary images with different angles and image sizes can be made as the present inventors have done. If the image has C columns, the rotation in radians is designated as "a", while using the horizontal projection profile, we have N=[a×C]. The absolute normalized amplitude of both of the corresponding spikes is set to 1/N+1', where N is the distance between the prominent spikes and [x] is the integer part of x.

Figure 2:
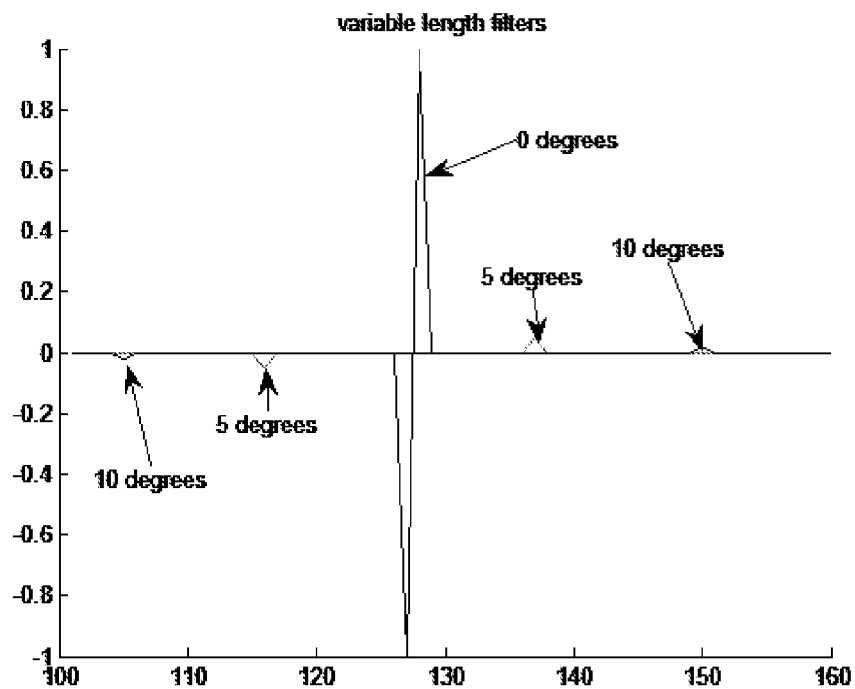
FIG. 2 is a plot that illustrates energy spikes concentrated in corresponding coefficients.

In one embodiment, an Integral Projection (IP) vector (or profile) is successively convoluted with variable length vectors[−100 . . . 01] (N, the number of zeros is varied), and the output is divided by N+1 (i.e., corresponding to different angle values as illustrated in FIG. 2). The second IP vector is convoluted in this embodiment with a fixed vector, [−1 1] (i.e., corresponding to 0 degrees in FIG. 2). The sum of the absolute differences of these filtered vectors is computed, and the length of the variable vector N that leads to the minimum value over the selected range is related to the rotation between two pictures or frames (see FIG. 2).

Figure 3A:
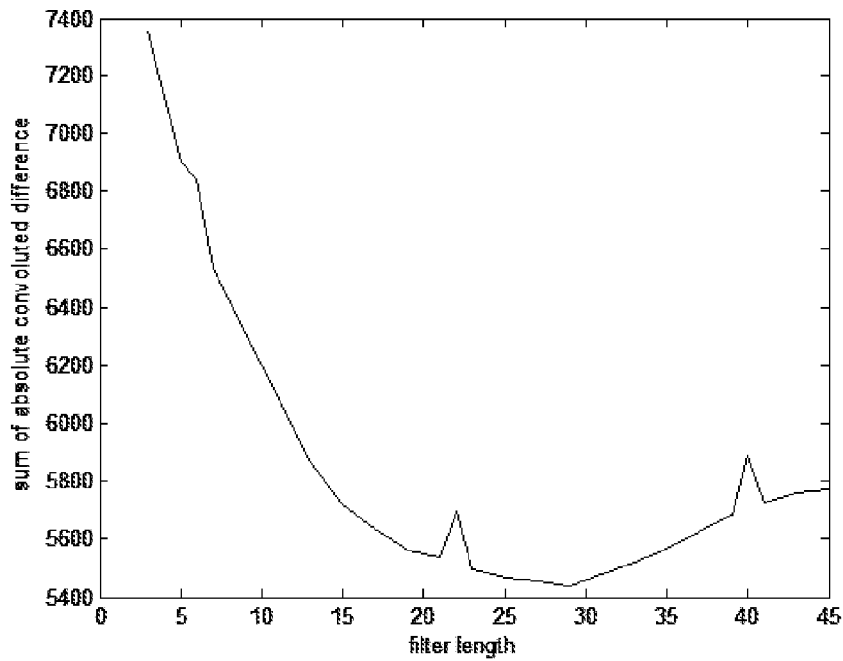
FIG. 3A is a plot that illustrates the sum of absolute convoluted vectors difference for different variable vector lengths/
Figure 3B:
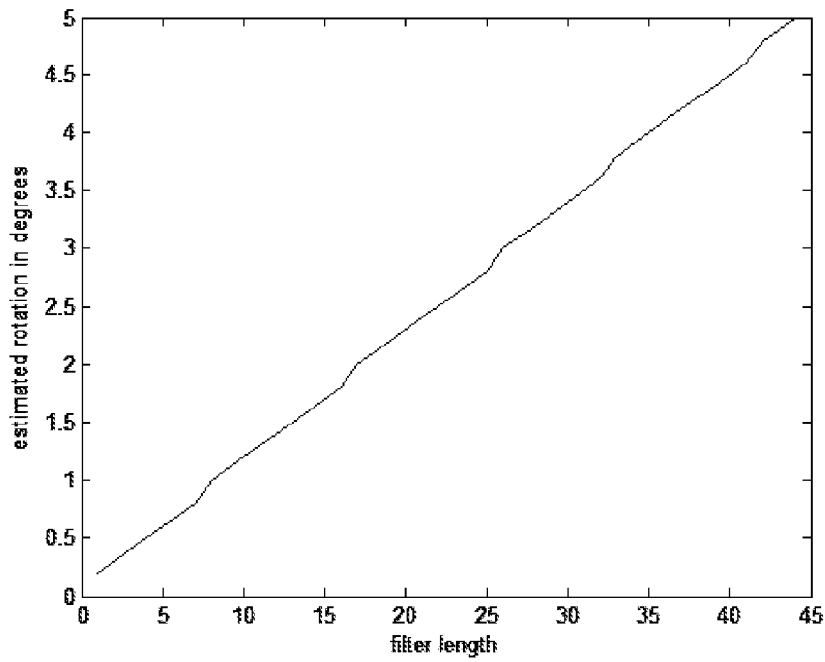
FIG. 3B is a plot that illustrates estimated rotation angle in degrees value as a function of vector length for a 512×512 image.

Referring now to FIGS. 3a-3b, the minimum is obtained for N=29 taps vector (see FIG. 3a) that corresponds to 3.2 degrees for a 512×512 image (see FIG. 3b). The estimated rotation increases rather linearly with the filter length for typical rotation values and inversely proportional with the image size. The convolution computations advantageously involve operations that are not resource-intensive. The sum of absolute differences can be replaced by the sum of squared differences. Generally, it obtains curves with deeper local minimums, but it has an increased numerical complexity. Also, for better accuracy, both horizontal and vertical projection profiles can be used. In this case, the minimum of the sum of both horizontal and vertical sums of absolute differences can be used in certain embodiments to indicate the suitable filter length. Sub-pixel registration techniques can also be used in certain embodiments, as well, for improving the accuracy of the rotation estimation.

Figure 4:
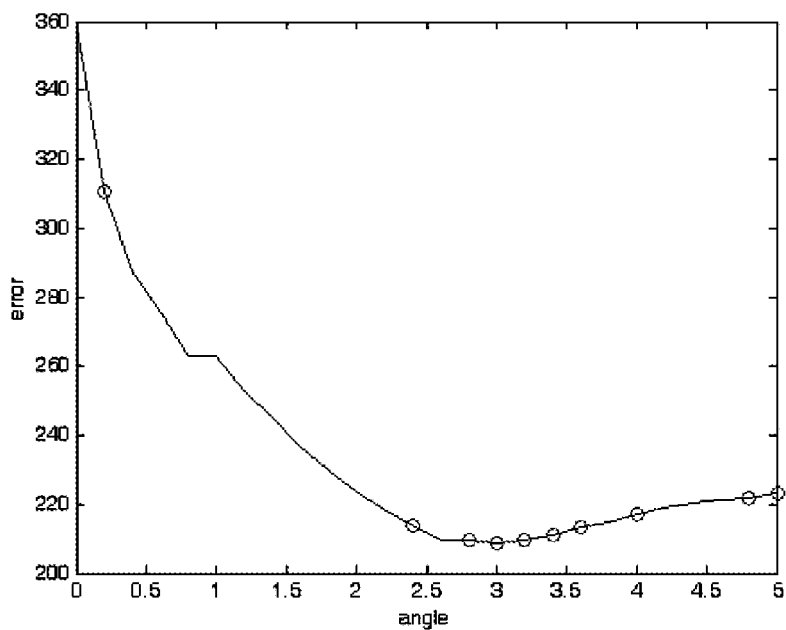
FIG. 4 is a plot that illustrates computed estimated rotations for a simulated 3 degree rotation.

The profiles can be optionally or selectively downscaled in certain embodiments in order to reduce the complexity of the calculation. The length of the full resolution profiles can also be optionally or selectively cropped. In further embodiments, a descent algorithm can be used in order to reduce the number of computations, including not performing a full search on all investigated rotation values. The local minima can be avoided by computing the error at different interval lengths. The interval length may be reduced until it is small enough. At each step, the rotation with the smallest error may be chosen as a central point in the next interval of three rotation values. FIG. 4 shows a plot that illustrates the computed estimated rotations for another simulated 3 degree rotation. The computed values (red circles) are a subset of the possible rotation angles.

Figure 5:
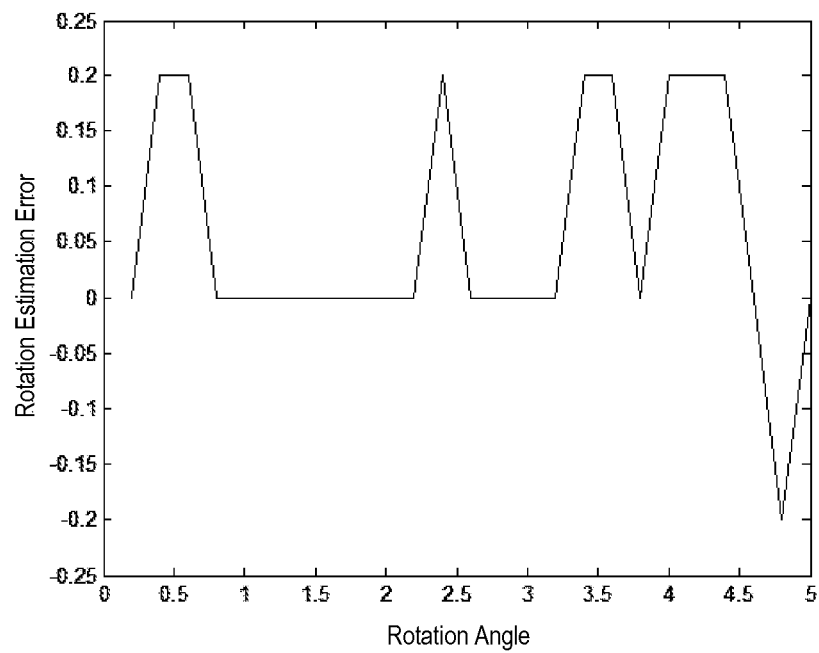
FIG. 5 is a plot that illustrates a simulated example where the rotation angle is varied from 0.2 degree to 5 degrees with a 0.2 degrees step.

The range of rotation values depends on the image size. In the example of a 512×512 image, for a 5 degree angle, the filter length involved in certain embodiments represents about 8% of the image size. Lower accuracy is expected if the filter length is more than a fifth of the image size. The accuracy depends on the details of the images. FIG. 5 shows a simulated example where the rotation angle is varied from 0.2 to 5 degrees with 0.2 degree steps. The absolute maximum rotation estimation error between the true rotation and the estimated rotation is 0.2. However, this error could be several times higher for some rotation values in cases of noisy or blurred binary maps with missing details. For example, it is common to have some blurred frames in a video sequence. In these cases, the rotation estimation may be less reliable. Therefore, in certain embodiment, an advantageous focus measure may be performed on both consecutive frames (see, e.g., WEI HUANG, ZHONGLIANG JING, "Evaluation of focus measures in multi-focus image fusion", Pattern Recognition Letters, v. 28 n. 4, p. 493-500, March 2007, incorporated by reference). The rotation estimation may be selectively performed only if there is a small enough difference (e.g., smaller than 20%) between focus measures.

In certain embodiments, it is determined whether the rotation is below a certain value. The exact sign of the rotation may or may not be determined, as such will not effect results much unless very small rotations are detected. For example, in order to stitch images or take pictures for a panorama picture, it is desired to known the sign only when very small rotations are detected. In other applications, it is desired to know the exact sign of the rotation, such as for pictures with fewer details and important absolute rotation values.

By way of non-limiting example, the exact sign can be obtained in the following ways using the available images. In certain embodiments, the second binary image is rotated back with the estimated angle and its vertical and horizontal integral projection vectors are computed. A cosine similarity coefficient (see, e.g., http://en.wikipedia.org/wiki/Cosine_similarity, incorporated by reference) between the horizontal integral projection of the first binary image and that of the rotated second binary image is computed. If A and B are the mentioned vectors, the cosine similarity, q, is represented using a dot product and magnitude as:

$$\text{similarity} = \cos(\theta) = \frac{A \cdot B}{\|A\| \cdot \|B\|}.$$

If this value is smaller than a threshold (e.g., 0.999), the sign of the rotation is changed, and otherwise is kept the same.

Figure 6:
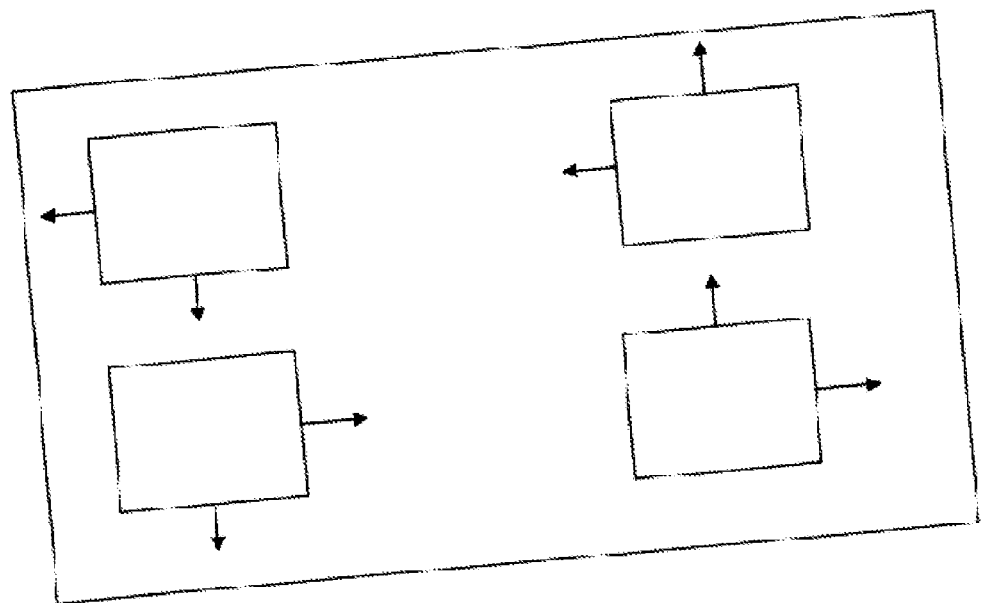
FIG. 6 illustrates schematically the relative direction of local windows when a camera is rotated.

Alternatively, the sign of the angle of rotation can be obtained from the motion computed in windows relative to the global motion. These translational displacements can be obtained by using known methods such as the integral projection methods described in applications by the same assignee including US2008/0309769, incorporated by reference. Their signs determine the sign of the rotation. A simulated opposite sign rotation change leads to sign changes of horizontal and vertical displacements, e.g., such as those illustrated at FIG. 6.

In other embodiments, the comparison of variable length convolutions can be applied on integral projection vectors obtained from differently exposed image pairs, e.g., Visible/Near InfraRed image pairs or pairs of image exposed for different durations (see, e.g., U.S. Ser. No. 12/941,983). The proposed method based on integral projection vectors can be used to refine the rotation estimation that is obtained when the computation is performed on local windows, e.g., as in FIG. 6. The assumption above is that the center of rotation is the center of the image or frame. However, the center of rotation can be differently located (e.g., closer to the image center or closer to other corner points). Angle estimations can be made on points taking into account the computed horizontal and vertical displacements. In certain embodiments, it is assumed that these displacement estimations are correct and the frames are aligned.

Figure 7:
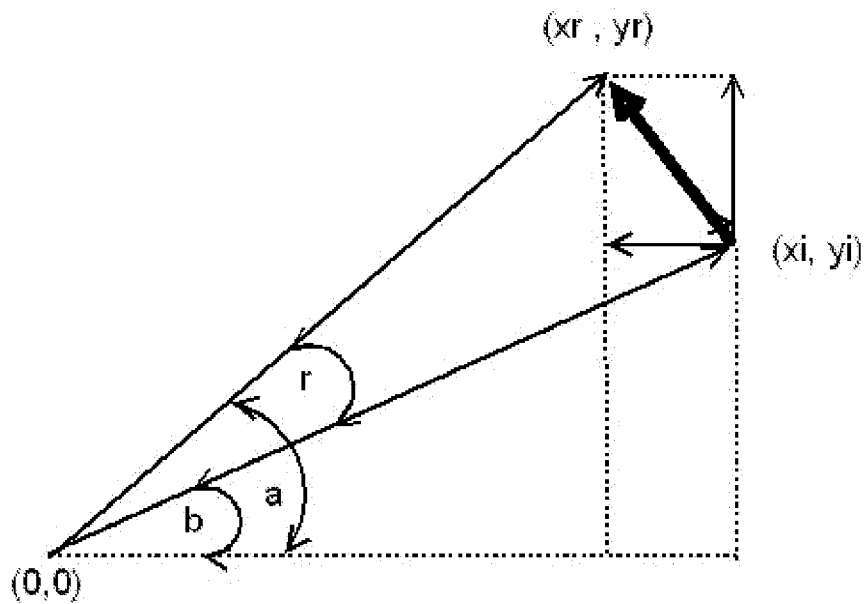
FIG. 7 illustrates an example of an angle estimation that can be made on points taking into account computed horizontal and vertical displacements.

FIG. 7 shows an example where the origin (0,0) can be placed in any point. The rotation r is obtained with the formula:

$$\tan r = \tan(a-b) = \frac{\tan a - \tan b}{1 + \tan a \tan b},$$

where b and a are the angles formed by the corner window center pixel with respect to the frame center in one frame (xi, yi) and the other (xr, yr), respectively (FIG. 7). The (xr, yr) values are obtained from (xi, yi) and computed local horizontal and vertical displacements. The corresponding rotation values for the points can form a vector and should have close values if the center of rotation coincides with or is close to the image center. If not, the rotation center can be chosen as the point with minimum estimated angle vector variance.

An average of all four computed rotation values can be used as an initial approximation. An advantageous integral projection method in accordance with certain embodiments uses fewer closer rotation values to the initial approximation and refines its value (see, e.g., FIG. 4). The computed center and rotation values are used for rotation compensation in the registration process. The binary images can be obtained by imposing thresholds after applying an edge detection procedure on the original images.

Image Rotation from Local Motion Estimates for Panorama Stitching

Certain embodiments build on motion estimation used for panorama creation and/or image stabilization. These use motion measured in four (4) small windows to give an indication of the amount of rotation in the current frame. If the amount of rotation is below a specified value, a panorama image can be captured. That is, in certain embodiments, it is determined not to capture a panorama image if the amount of rotation is too large. Using this condition, the registration and stitching of captured panorama image advantageously looks and feels very natural.

In certain embodiments, a low complexity extension of panorama creation techniques described at U.S. Ser. No. 12/636,629, incorporated by reference. The output of motion estimation is used to measure rotation, which is then used to capture an image for stitching when the rotation is a minimum and/or below a defined threshold. This avoids the heavier computation involved in rotation above the threshold and/or not at the minimum, and provides a panorama image free from or with minimal rotation.

Motion estimation, which may be advantageously used in panorama creation and video image stabilization, may be in accordance with certain descriptions found at any of U.S. Pat. Nos. 7,773,118, 7,697,778, 7,676,108, 7,660,478, 7,639,889, 7,636,486, and/or 7,639,888; and/or Published US applications nos. US 2010-0329582, US 2010-0328472, US 2010-0201826, US 2010-0201827, US 2009-0179999, US 2009-0309769, US 2010-0303343, US 2009-0167893, US 2009-0080796, US 2007-0296833, US 2008-0219581, and/or US 2008-0309770; and/or U.S. Ser. Nos. 12/956,904, 12/941,983, 12/820,086, and/or 12/820,034, which belong to the same assignee and are hereby incorporated by reference. The basis for many of these existing patents and patent applications is the measurement of motion between consecutive image frames. In video image stabilization, motion is typically measured between whole consecutive image frames, known as global motion estimation, and also between four (4) smaller windows which are used to check for the movement of local objects.

In certain embodiments, the difference between the local motion estimates and the global value is used to measure the rotation between image frames. When there is no rotation between image frames, local motion estimates should generally be the same as the global value. In the presence of rotation, the local windows record different motions arising from relative motion. For example, under counter-clockwise rotation the two left windows will have a different relative motion compared to the two right windows. The two left windows will move down reporting a lower relative motion value than the right windows which will report a higher motion value as they move upwards.

Similar relative motion occurs horizontally where the two top windows and the two bottom windows undergo the opposite relative motion. To determine the angle of rotation in certain embodiments, the difference between the motion measured for each local window in x & y is found. Then, the angle of rotation is calculated by using the distance of the center of each local window from the center of the whole image frame. The motion measured from full image frames is taken to be centered at the image center. Therefore, the distance to the center of the local window to the full image centre, along with the relative motion can be used to determine the angle of motion.

As an example, ydisp [0] may represent the global motion in the vertical direction and ydisp[1] the motion from one of the windows. Then, the motion due to rotation is ydispRot[1] =ydisp[0]−ydisp[1]. The subtraction removes the translation component and the angle of rotation is calculated using the tan function as below Roty[1]=arctan(ydispRot[1]/distanceY), where distanceY is the horizontal distance to the centre of the local window from the image centre. The above calculation can be carried out for all frames and all windows. The results can be averaged to provide an indication of the amount of rotation in degrees. Then during panorama capture, for example, the algorithm can be configured to take a new image for registration anytime when the images overlap by a desired amount, e.g., 20-40%. Then, a new image will be captured for registration in certain embodiments when the overlap is within the defined region and the rotation is below a defined angle. If the algorithm does not meet the criteria before the minimum overlap is reached, an image may be in certain embodiments captured as would have been the case without rotation checking. This gives the opportunity for the system to capture images with low rotation making the stitching operation more efficient while creating a better panorama without an unnecessarily complex rotation measurement and re-sampling before stitching. In techniques in accordance with certain embodiments, computed motion estimates are used to perform lightweight analysis of rotation to enable better stitching and panoramas.

Object Detection from Image Profiles

Using image profiles that are generated for panorama creation or video image stabilization, moving objects are detected in accordance with certain embodiments within an image frame. This is done by aligning the image profiles after an initial motion estimation has been measured. The absolute differences between the profiles will subsequently be due to movement from an object or subject or region of interest.

Figure 8:
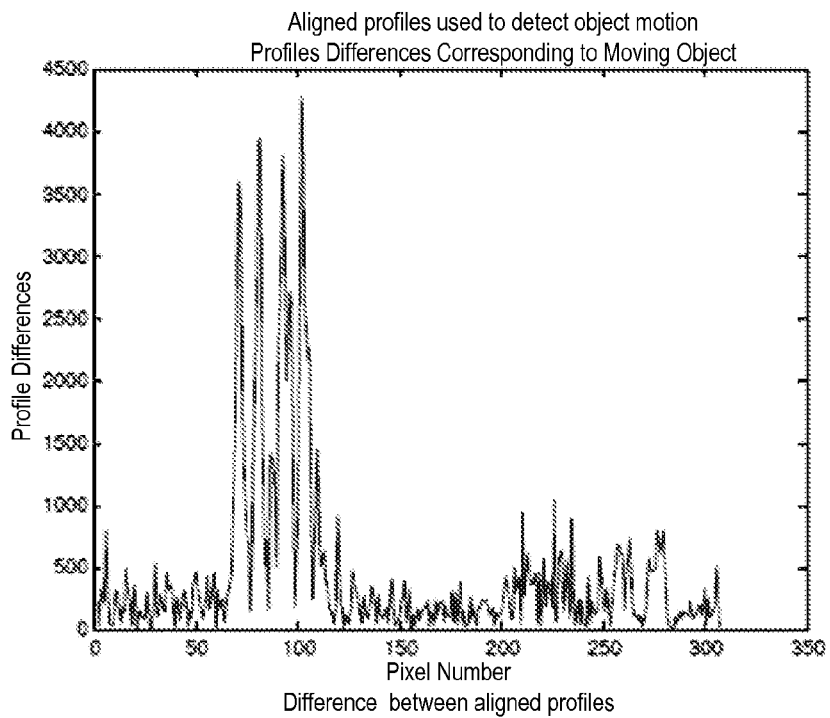
FIG. 8 illustrates a plot of profile differences for aligned profiles used to detect object motion.
Figure 9:
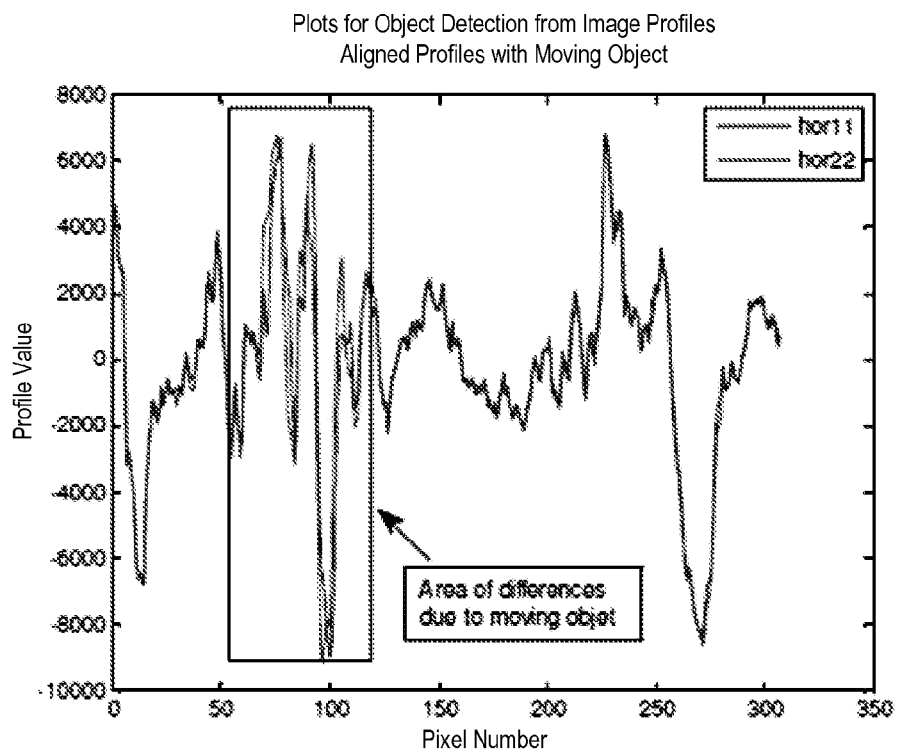
FIG. 9 illustrates a plot of aligned, moving image profiles used for object detection and/or tracking.

When two profiles are re-aligned, a large difference in the profiles will typically correspond to the movement of an object. The plots shown in FIGS. 8-9 illustrate profiles re-aligned after the shift between the frames has been measured. The rectangular box in FIG. 9 highlights an area where the profiles have the highest differences. If the difference between these profiles is plotted, the location of the peak helps identify the moving object. This location can then be used to mark the area of a moving object or can be used in conjunction with another object detection process to monitor the objects movement. The result of taking the differences can be striking as illustrated in FIGS. 8-9. When the object movement is smaller, the profile difference is much noisier and so the location of the maximum profile difference can tend to give an unreliable result. For each frame, the result of a thresholding operation on the difference profile is stored in accordance with certain embodiments. If the profile does not have a strong peak, the thresholding can be returned in certain embodiments to an all zero result in which case the objected location may be assigned the previous reliable result. When the object moves strongly, the profile differences tend to be high and the location of a moving object is easier to detect.

Functionality of panorama and video image stabilization profiles may be used to detect moving objects as described above. This can help panorama stitching avoid stitching through objects/subjects and separately may be useful for scene analysis applications in quickly detecting the location of moving objects.

While an exemplary drawings and specific embodiments of the present invention have been described and illustrated, it is to be understood that that the scope of the present invention is not to be limited to the particular embodiments discussed. Thus, the embodiments shall be regarded as illustrative rather than restrictive, and it should be understood that variations may be made in those embodiments by workers skilled in the arts without departing from the scope of the present invention.

In addition, in methods that may be performed according to preferred embodiments herein and that may have been described above, the operations have been described in selected typographical sequences. However, the sequences have been selected and so ordered for typographical convenience and are not intended to imply any particular order for performing the operations, except for those where a particular order may be expressly set forth or where those of ordinary skill in the art may deem a particular order to be necessary.

In addition, all references cited above and below herein, as well as the background, invention summary, abstract and brief description of the drawings, are all incorporated by reference into the detailed description of the preferred embodiments as disclosing alternative embodiments.

The following are incorporated by reference as disclosing features that may be implemented into alternative embodiments:

U.S. Pat. Nos. 7,639,888, 7,636,486, 7,639,889, 7,660,478, 7,773,118, and 7,864,990, and 7,620,218; and United States published applications no. US2008/0219581, US2007/0296833, US2008/0309769, US2010/0238309, US2009/0167893, US2008/0309770, US2009/0080796, US2009/0303343, US2009/0179999, US2010/0329582, US2010/0328472, US2010/0201826, US2008/0231713, US2008/0309770, US2009/0263022, and US2009/0303342; and U.S. patent application Ser. Nos. 12/572,930, 12/636,608, 12/879,003, 12/941,983, and 12/944,701; and B. ZITOVA, J. FLUSSER, "Image registration methods: a survey", Image and Vision Computing, 21 (2003) 977-1000;

KUGLIN C D., HINES D C, "The phase correlation image alignment method", In Proc. Int. Conf. Cybernetics and Society, IEEE, 1975;

M. MA, A. VAN GENDEREN, P. BEUKELMAN, "A sign bit only phase normalization for rotation and scale invariant template matching", Proceedings of the 16th Annual Workshop on Circuits, Systems and Signal Processing, ProRisc 2005, pp. 641-646;

CHEN TING, "Video stabilization algorithm using a block-based parametric motion model", EE392J Project Report, 2000, Stanford University, CA;

G. S. PEAKE, T. N. TAN, "A general algorithm for document skew angle estimation", IEEE Int. Conf. Image Process. 2 (1997) 230-233;

GREG WARD, "Fast, robust image registration for compositing high dynamic range photographs from handheld exposures", Journal of graphic tools, 8(2):17-30, 2003;

Wikipedia reference: Cosine similarity, URL: http://en.wikipedia.org/wiki/Cosine_similarity JONATAN BLOMSTER, "Orientation estimation combining vision and gyro measurements", Master's Degree Project. Stockholm, Sweden 2006-04-06. XR-EE-SB 2006:012;

YI WAN, NING WEI, "A fast algorithm for recognizing translated, rotated, reflected and scaled objects from only their projections", IEEE Signal Processing Letters, vol. 17, No. 1, pp: 71-74, January 2010; and WEI HUANG, ZHONGLIANG JING, "Evaluation of focus measures in multi-focus image fusion", Pattern Recognition Letters, v. 28 n. 4, p. 493-500, March 2007.

What is claimed is:

1. Within an image acquisition device, a method of detecting rotation from matching corner regions of acquired images, comprising:

acquiring a sequence of image frames; and determining a measure of frame-to-frame rotation, including:

performing a global XY alignment of a first frame and a second, following frame of said sequence of image frames;

determining local XY alignments in at least two matching corner regions of the first and second frames after the global XY alignment; and based on the differences between said local XY alignments, determining a global rotation of the second frame relative to the first frame;

performing a further action based on the determined global rotation;

determining horizontal and vertical integral projection vector gradients for each of the first frame and the second, following, image frame in said sequence;

normalizing said integral projection vector gradients; and determining locations of primary maximum and minimum peaks of said integral projection vector gradients; and wherein the global rotation determining is further based on normalized distances between the primary maximum and minimum peaks.

2. The method of claim 1, wherein the further action comprises joining adjacent frames of a panorama image; predicting a location of a tracked object in a subsequent frame; providing an image with reduced blur than at least one of the first and second frames; or providing a more stable video sequence by removing one or more undesired motion artifacts, or combinations thereof.

3. The method of claim 1, further comprising determining delta-X and delta-Y differences between the at least two matching corner regions; and wherein the global rotation determining is based further on said delta-X and delta-Y differences.

4. Within an image acquisition device, a method of detecting rotation from matching corner regions of acquired images, comprising:

acquiring a sequence of image frames; and determining a measure of frame-to-frame rotation, including:

performing a global XY alignment of a first frame and a second, following frame of said sequence of image frames;

determining local XY alignments in at least two matching corner regions of the first and second frames after the global XY alignment; and based on the differences between said local XY alignments, determining a global rotation of the second frame relative to the first frame;

performing a further action based on the determined global rotation;

determining horizontal and vertical integral projection vectors for each of the first frame and the second, following, image frame in said sequence;

successively convoluting a first integral projection vector with a variable length vector;

convoluting a second integral projection vector with a fixed length vector; and determining an absolute sum of differences between filtered vectors based on the convoluting of the first and second integral projection vectors; and wherein the global rotation determining is further based on a length of a variable vector N that leads to a minimum value of the absolute sum of the differences.

5. The method of claim 4, wherein the further action comprises joining adjacent frames of a panorama image; predicting a location of a tracked object in a subsequent frame; providing an image with reduced blur than at least one of the first and second frames; or providing a more stable video sequence by removing one or more undesired motion artifacts, or combinations thereof.

6. The method of claim 4, further comprising determining delta-X and delta-Y differences between the at least two matching corner regions; and wherein the global rotation determining is based further on said delta-X and delta-Y differences.

7. Within an image acquisition device, a method of detecting rotation from matching regions of acquired images, comprising:

acquiring a sequence of image frames;

determining a measure of frame-to-frame rotation, including:

performing a global XY alignment of a first frame and second, following frame of said image sequence;

determining local XY alignments in at least two matching regions of the aligned image pair;

determining delta-X and delta-Y differences between the at least two matching regions; and calculating a global frame-to-frame rotation from said delta-X and delta-Y differences;

performing a further action based on the calculated global frame to frame rotation; and the method further comprising determining horizontal and vertical integral projection vector gradients for each of the first frame and the second, following, image frame in said sequence;

normalizing said integral projection vector gradients; and determining locations of primary maximum and minimum peaks of said integral projection vector gradients; and wherein the global rotation determining is further based on normalized distances between the primary maximum and minimum peaks.

8. The method of claim 7, wherein the further action comprises joining adjacent frames of a panorama image; predicting a location of a tracked object in a subsequent frame; providing an image with reduced blur than at least one of the first and second frames; or providing a more stable video sequence by removing one or more undesired motion artifacts, or combinations thereof.

9. Within an image acquisition device, a method of detecting rotation from matching regions of acquired images, comprising:

acquiring a sequence of image frames;

determining a measure of frame-to-frame rotation, including:

performing a global XY alignment of a first frame and second, following frame of said image sequence;

determining local XY alignments in at least two matching regions of the aligned image pair;

determining delta-X and delta-Y differences between the at least two matching regions; and calculating a global frame-to-frame rotation from said delta-X and delta-Y differences;

performing a further action based on the calculated global frame to frame rotation;

determining horizontal and vertical integral projection vectors for each of the first frame and the second, following, image frame in said sequence;

successively convoluting a first integral projection vector with a variable length vector;

convoluting a second integral projection vector with a fixed length vector; and determining an absolute sum of differences between filtered vectors based on the convoluting of the first and second integral projection vectors; and wherein the global rotation determining is further based on a length of a variable vector N that leads to a minimum value of the absolute sum of the differences.

10. The method of claim 9, wherein the further action comprises joining adjacent frames of a panorama image; predicting a location of a tracked object in a subsequent frame; providing an image with reduced blur than at least one of the first and second frames; or providing a more stable video sequence by removing one or more undesired motion artifacts, or combinations thereof.

11. An image acquisition device, comprising:
a lens, shutter and image sensor for acquiring digital images;
a processor;
a memory having code embedded therein for programming the processor to perform a method of detecting rotation from matching corner regions of acquired images, wherein the method comprises:
acquiring a sequence of image frames; and
determining a measure of frame-to-frame rotation, including:
performing a global XY alignment of a first frame and a second, following frame of said sequence of image frames;
determining local XY alignments in at least two matching corner regions of the first and second frames after the global XY alignment; and
based on the differences between said local XY alignments, determining a global rotation of the second frame relative to the first frame; and
performing a further action based on the determined global rotation; and
wherein the method further comprises determining horizontal and vertical integral projection vector gradients for each of the first frame and the second, following, image frame in said sequence;
normalizing said integral projection vector gradients; and
determining locations of primary maximum and minimum peaks of said integral projection vector gradients; and
wherein the global rotation determining is further based on normalized distances between the primary maximum and minimum peaks.

12. The device of claim 11, wherein the further action comprises joining adjacent frames of a panorama image; predicting a location of a tracked object in a subsequent frame; providing an image with reduced blur than at least one of the first and second frames; or providing a more stable video sequence by removing one or more undesired motion artifacts, or combinations thereof.

13. The device of claim 11, wherein the method further comprises determining delta-X and delta-Y differences between the at least two matching corner regions; and wherein the global rotation determining is based further on said delta-X and delta-Y differences.

14. An image acquisition device, comprising:
a lens, shutter and image sensor for acquiring digital images;
a processor;
a memory having code embedded therein for programming the processor to perform a method of detecting rotation from matching corner regions of acquired images, wherein the method comprises:
acquiring a sequence of image frames; and
determining a measure of frame-to-frame rotation, including:
performing a global XY alignment of a first frame and a second, following frame of said sequence of image frames;
determining local XY alignments in at least two matching corner regions of the first and second frames after the global XY alignment; and
based on the differences between said local XY alignments, determining a global rotation of the second frame relative to the first frame;
performing a further action based on the determined global rotation; and
wherein the method further comprises determining horizontal and vertical integral projection vectors for each of the first frame and the second, following, image frame in said sequence;
successively convoluting a first integral projection vector with a variable length vector;
convoluting a second integral projection vector with a fixed length vector; and
determining an absolute sum of differences between filtered vectors based on the convoluting of the first and second integral projection vectors; and
wherein the global rotation determining is further based on a length of a variable vector N that leads to a minimum value of the absolute sum of the differences.

15. The device of claim 14, wherein the further action comprises joining adjacent frames of a panorama image; predicting a location of a tracked object in a subsequent frame; providing an image with reduced blur than at least one of the first and second frames; or providing a more stable video sequence by removing one or more undesired motion artifacts, or combinations thereof.

16. The device of claim 14, wherein the method further comprises determining delta-X and delta-Y differences between the at least two matching corner regions; and wherein the global rotation determining is based further on said delta-X and delta-Y differences.

17. An image acquisition device, comprising:
a lens, shutter and image sensor for acquiring digital images;
a processor;
a memory having code embedded therein for programming the processor to perform a method of detecting rotation from matching regions of acquired images, wherein the method comprises:
acquiring a sequence of image frames;
determining a measure of frame-to-frame rotation, including:
performing a global XY alignment of a first frame and second, following frame of said image sequence;
determining local XY alignments in at least two matching regions of the aligned image pair;
determining delta-X and delta-Y differences between the at least two matching regions; and
calculating a global frame-to-frame rotation from said delta-X and delta-Y differences; and
performing a further action based on the calculated global frame to frame rotation;
wherein the method further comprises determining horizontal and vertical integral projection vector gradients for each of the first frame and the second, following, image frame in said sequence;
normalizing said integral projection vector gradients; and
determining locations of primary maximum and minimum peaks of said integral projection vector gradients; and
wherein the global rotation determining is further based on normalized distances between the primary maximum and minimum peaks.

18. The device of claim 17, wherein the further action comprises joining adjacent frames of a panorama image; predicting a location of a tracked object in a subsequent frame; providing an image with reduced blur than at least one of the first and second frames; or providing a more stable video sequence by removing one or more undesired motion artifacts, or combinations thereof.

19. An image acquisition device, comprising:
a lens, shutter and image sensor for acquiring digital images;
a processor;
a memory having code embedded therein for programming the processor to perform a method of detecting rotation from matching regions of acquired images, wherein the method comprises:
acquiring a sequence of image frames;
determining a measure of frame-to-frame rotation, including:
performing a global XY alignment of a first frame and second, following frame of said image sequence;
determining local XY alignments in at least two matching regions of the aligned image pair;
determining delta-X and delta-Y differences between the at least two matching regions; and
calculating a global frame-to-frame rotation from said delta-X and delta-Y differences; and
performing a further action based on the calculated global frame to frame rotation
wherein the method further comprises determining horizontal and vertical integral projection vectors for each of the first frame and the second, following, image frame in said sequence;
successively convoluting a first integral projection vector with a variable length vector;
convoluting a second integral projection vector with a fixed length vector; and
determining an absolute sum of differences between filtered vectors based on the convoluting of the first and second integral projection vectors; and
wherein the global rotation determining is further based on a length of a variable vector N that leads to a minimum value of the absolute sum of the differences.

20. The device of claim 19, wherein the further action comprises joining adjacent frames of a panorama image; predicting a location of a tracked object in a subsequent frame; providing an image with reduced blur than at least one of the first and second frames; or providing a more stable video sequence by removing one or more undesired motion artifacts, or combinations thereof.

21. One or more non-transitory processor-readable media having code embedded therein for programming the processor to perform a method of detecting rotation from matching corner regions of acquired images of a sequence of image frames, wherein the method comprises:
determining a measure of frame-to-frame rotation, including:
performing a global XY alignment of a first frame and a second, following frame of said sequence of image frames;
determining local XY alignments in at least two matching corner regions of the first and second frames after the global XY alignment; and
based on the differences between said local XY alignments, determining a global rotation of the second frame relative to the first frame; and
performing a further action based on the determined global rotation; and
wherein the method further comprises determining horizontal and vertical integral projection vector gradients for each of the first frame and the second, following, image frame in said sequence;
normalizing said integral projection vector gradients; and
determining locations of primary maximum and minimum peaks of said integral projection vector gradients; and
wherein the global rotation determining is further based on normalized distances between the primary maximum and minimum peaks.

22. The one or more non-transitory processor-readable media of claim 21, wherein the further action comprises joining adjacent frames of a panorama image; predicting a location of a tracked object in a subsequent frame; providing an image with reduced blur than at least one of the first and second frames; or providing a more stable video sequence by removing one or more undesired motion artifacts, or combinations thereof.

23. The one or more non-transitory processor-readable media of claim 21, wherein the method further comprises determining delta-X and delta-Y differences between the at least two matching corner regions; and wherein the global rotation determining is based further on said delta-X and delta-Y differences.

24. One or more non-transitory processor-readable media having code embedded therein for programming the processor to perform a method of detecting rotation from matching corner regions of acquired images of a sequence of image frames, wherein the method comprises:
determining a measure of frame-to-frame rotation, including:
performing a global XY alignment of a first frame and a second, following frame of said sequence of image frames;
determining local XY alignments in at least two matching corner regions of the first and second frames after the global XY alignment; and
based on the differences between said local XY alignments, determining a global rotation of the second frame relative to the first frame;
performing a further action based on the determined global rotation; and
wherein the method further comprises determining horizontal and vertical integral projection vectors for each of the first frame and the second, following, image frame in said sequence;
successively convoluting a first integral projection vector with a variable length vector;
convoluting a second integral projection vector with a fixed length vector; and
determining an absolute sum of differences between filtered vectors based on the convoluting of the first and second integral projection vectors; and
wherein the global rotation determining is further based on a length of a variable vector N that leads to a minimum value of the absolute sum of the differences.

25. The one or more non-transitory processor-readable media of claim 24, wherein the further action comprises joining adjacent frames of a panorama image; predicting a location of a tracked object in a subsequent frame; providing an image with reduced blur than at least one of the first and second frames; or providing a more stable video sequence by removing one or more undesired motion artifacts, or combinations thereof.

26. The one or more non-transitory processor-readable media of claim 24, wherein the method further comprises determining delta-X and delta-Y differences between the at least two matching corner regions; and wherein the global rotation determining is based further on said delta-X and delta-Y differences.

27. One or more non-transitory processor-readable media having code embedded therein for programming the processor to perform a method of detecting rotation from matching regions of acquired images of a sequence of image frames, wherein the method comprises:
   determining a measure of frame-to-frame rotation, including:
      performing a global XY alignment of a first frame and second, following frame of said image sequence;
      determining local XY alignments in at least two matching regions of the aligned image pair;
      determining delta-X and delta-Y differences between the at least two matching regions; and
      calculating a global frame-to-frame rotation from said delta-X and delta-Y differences;
      performing a further action based on the calculated global frame to frame rotation; and
      wherein the method further comprises determining horizontal and vertical integral projection vector gradients for each of the first frame and the second, following, image frame in said sequence;
      normalizing said integral projection vector gradients; and
      determining locations of primary maximum and minimum peaks of said integral projection vector gradients; and
      wherein the global rotation determining is further based on normalized distances between the primary maximum and minimum peaks.

28. The one or more non-transitory processor-readable media of claim 27, wherein the further action comprises joining adjacent frames of a panorama image; predicting a location of a tracked object in a subsequent frame; providing an image with reduced blur than at least one of the first and second frames; or providing a more stable video sequence by removing one or more undesired motion artifacts, or combinations thereof.

29. One or more non-transitory processor-readable media having code embedded therein for programming the processor to perform a method of detecting rotation from matching regions of acquired images of a sequence of image frames, wherein the method comprises:
   determining a measure of frame-to-frame rotation, including:
      performing a global XY alignment of a first frame and second, following frame of said image sequence;
      determining local XY alignments in at least two matching regions of the aligned image pair;
      determining delta-X and delta-Y differences between the at least two matching regions; and
      calculating a global frame-to-frame rotation from said delta-X and delta-Y differences;
      performing a further action based on the calculated global frame to frame rotation; and
      wherein the method further comprises determining horizontal and vertical integral projection vectors for each of the first frame and the second, following, image frame in said sequence;
      successively convoluting a first integral projection vector with a variable length vector;
      convoluting a second integral projection vector with a fixed length vector; and
      determining an absolute sum of differences between filtered vectors based on the convoluting of the first and second integral projection vectors; and
      wherein the global rotation determining is further based on a length of a variable vector N that leads to a minimum value of the absolute sum of the differences.

30. The one or more non-transitory processor-readable media of claim 29, wherein the further action comprises joining adjacent frames of a panorama image; predicting a location of a tracked object in a subsequent frame; providing an image with reduced blur than at least one of the first and second frames; or providing a more stable video sequence by removing one or more undesired motion artifacts, or combinations thereof.

* * * * *